US007775108B2

(12) United States Patent
Montanari

(10) Patent No.: US 7,775,108 B2
(45) Date of Patent: Aug. 17, 2010

(54) BALANCING MACHINE FOR VEHICLE WHEELS WITH ANALOG TO DIGITAL CONVERSION AND ADJUSTABLE SAMPLING FREQUENCY

(75) Inventor: Marco Montanari, Campegine (IT)

(73) Assignee: SICAM S.r.l., Correggio (IT)

( * ) Notice: Subject to any disclaimer, the term of this patent is extended or adjusted under 35 U.S.C. 154(b) by 421 days.

(21) Appl. No.: 11/896,517

(22) Filed: Sep. 4, 2007

(65) Prior Publication Data
US 2008/0053223 A1 Mar. 6, 2008

(30) Foreign Application Priority Data
Sep. 5, 2006 (IT) .......................... MO2006A0267

(51) Int. Cl.
G01M 1/16 (2006.01)
(52) U.S. Cl. .......................... 73/460; 301/5.21; 73/457
(58) Field of Classification Search .................. 73/457, 73/462, 473, 460; 301/5.21
See application file for complete search history.

(56) References Cited

U.S. PATENT DOCUMENTS

| 4,435,982 | A | * | 3/1984 | Borner et al. ................. 73/462 |
| 5,054,918 | A | * | 10/1991 | Downing et al. ....... 356/139.09 |
| 5,201,224 | A | * | 4/1993 | Rogers et al. .................. 73/462 |
| 5,614,676 | A | * | 3/1997 | Dutt et al. ...................... 73/660 |
| 6,244,108 | B1 | * | 6/2001 | McInnes et al. ............... 73/462 |
| 6,360,593 | B1 | * | 3/2002 | Schoenfeld ................... 73/146 |
| 6,408,528 | B1 | * | 6/2002 | Diez ....................... 33/203.12 |
| 6,672,158 | B1 | * | 1/2004 | Goebel et al. ................. 73/462 |
| 6,741,169 | B2 | * | 5/2004 | Magiawala et al. ......... 340/438 |
| 6,759,952 | B2 | * | 7/2004 | Dunbridge et al. .......... 340/444 |
| 6,772,626 | B1 | * | 8/2004 | Engel et al. .................... 73/146 |
| 6,789,422 | B1 | * | 9/2004 | Ward, Jr. ....................... 73/462 |
| 7,443,288 | B2 | * | 10/2008 | Dunbridge et al. .......... 340/444 |
| 2003/0006890 | A1 | * | 1/2003 | Magiawala et al. ......... 340/438 |
| 2003/0006893 | A1 | * | 1/2003 | Dunbridge et al. .......... 340/444 |
| 2003/0196492 | A1 | * | 10/2003 | Remboski et al. ............. 73/593 |
| 2004/0217853 | A1 | * | 11/2004 | Dunbridge et al. .......... 340/444 |
| 2008/0234964 | A1 | * | 9/2008 | Miyasaka et al. ........... 702/113 |

* cited by examiner

Primary Examiner—Hezron Williams
Assistant Examiner—Samir M Shah
(74) Attorney, Agent, or Firm—Hoffman, Wasson and Gitler, PC

(57) ABSTRACT

The upgraded balancing machine for vehicle wheels comprise a supporting frame for gripping and rotation means for gripping and rotating a wheel to be balanced around a rotation axis, a first sensor for detecting the unbalance of the wheel with respect to the rotation axis suitable for generating a first analog signal, a second sensor for detecting at least one portion of the profile of the wheel suitable for generating a second analog signal, at least one analog to digital converter associated with at least one of the first and the second detection sensors and suitable for converting at least one of the first and the second analog signals into a corresponding digital signal, a processing and control unit associated with the conversion device and suitable for processing the digital signal, and an adjustment unit for adjusting the sampling frequency of at least one of the first and the second analog signals associated with the conversion device. The adjustment unit responds to a first signal generated by a shaft encoder, and responds to a programmable timer, so that the frequency of the sampling operation can be altered.

17 Claims, 2 Drawing Sheets

BALANCING MACHINE FOR VEHICLE WHEELS WITH ANALOG TO DIGITAL CONVERSION AND ADJUSTABLE SAMPLING FREQUENCY

The present invention refers to an upgraded balancing machine for vehicle wheels.

BACKGROUND OF THE INVENTION

It is known that vehicle wheels are generally made up of a cylindrical metal rim having, at the axial ends, ring-shaped flanges between which is defined a channel for the interlock of an elastic tire, the side portions of which, the so-called "beads", are positioned fast up to the ring-shaped flanges.

The need is also known to perform frequent balancing operations that consist in applying weights, made of lead or other material, at predetermined points of the wheel and along the rim.

The fitting of the weights offsets the presence of any tire and/or rim irregularities during the rotation of the wheel.

To perform such operations, balancing machines are commonly used that comprise a supporting structure for wheel gripping and rotation means, such as a horizontal shaft that can turn axially by means of motor means and onto which the wheel rim is keyed.

The measurement of the wheel unbalance is detected during rotation by suitable electronic or electromechanical devices, such as force transducers fitted along the horizontal shaft.

Other characteristic measurements are generally added to the unbalance measurement such as the measurement of the wheel roundness, the eccentricity of the wheel, the amount of tread wear, etc. Such measurements are normally performed by means of suitable measuring sensors, with or without contacting the wheel (for example feeler pins or optical sensors).

Each of the detected measurements is normally related to a respective angular position of the wheel on the rotation axis detected by an angular position transducer (encoder) associated with the horizontal shaft.

In particular, the unbalance and the other specific measurements made on the wheel are performed by sampling the signals coming from the respective measuring sensors at preset and constant angular intervals determined by the technical characteristics of the encoder.

These known balancing machines are however susceptible to upgrading, in particular, in order to upgrade the quality and the precision of the measurements taken.

In fact, the frequency of samplings made by the measuring devices on the wheel is closely tied to predetermined angular positions and is restricted by the technical characteristics of the encoder. In particular, the angular resolution of the encoder, generally suitable for measuring unbalance, can be insufficient and not allow sufficiently accurate measurements in case, for example, of measuring the roundness or the eccentricity of the wheel. In fact, the low resolution of the measurements made, together with the presence of numerous branched grooves that extend irregularly on the surface of the tread, tends to falsify the testing of the tire characteristics.

BRIEF SUMMARY OF THE INVENTION

The main aim of the present invention is to provide an upgraded balancing machine for vehicle wheels that permits upgrading the quality and the precision of the measurements taken without having to increase the angular resolution of the encoder.

Within the scope of this technical aim, another object of the present invention is to achieve the above-noted aims with a simple structure, of relatively practical implementation, safe to use and with effective operation, as well as having a relatively low cost.

The objects indicated above are all achieved by the present upgraded balancing machine for vehicle wheels, comprising a supporting frame for gripping and rotation means for gripping and rotating a wheel to be balanced around a rotation axis, first detection means for detecting the unbalance of said wheel with respect to said rotation axis suitable for generating a first analog signal, second detection means for detecting at least one portion of the profile of said wheel suitable for generating a second analog signal, at least one conversion device associated with at least one of said first and said second detection means and suitable for converting at least one of said first and said second analog signal into a corresponding digital signal, a processing and control unit associated with said conversion device and suitable for processing said digital signal, and adjustment means which are suitable for adjusting the sampling frequency of at least one of said first and said second analog signal and which are associated with said conversion device.

DETAILED DESCRIPTION

Figure 1:
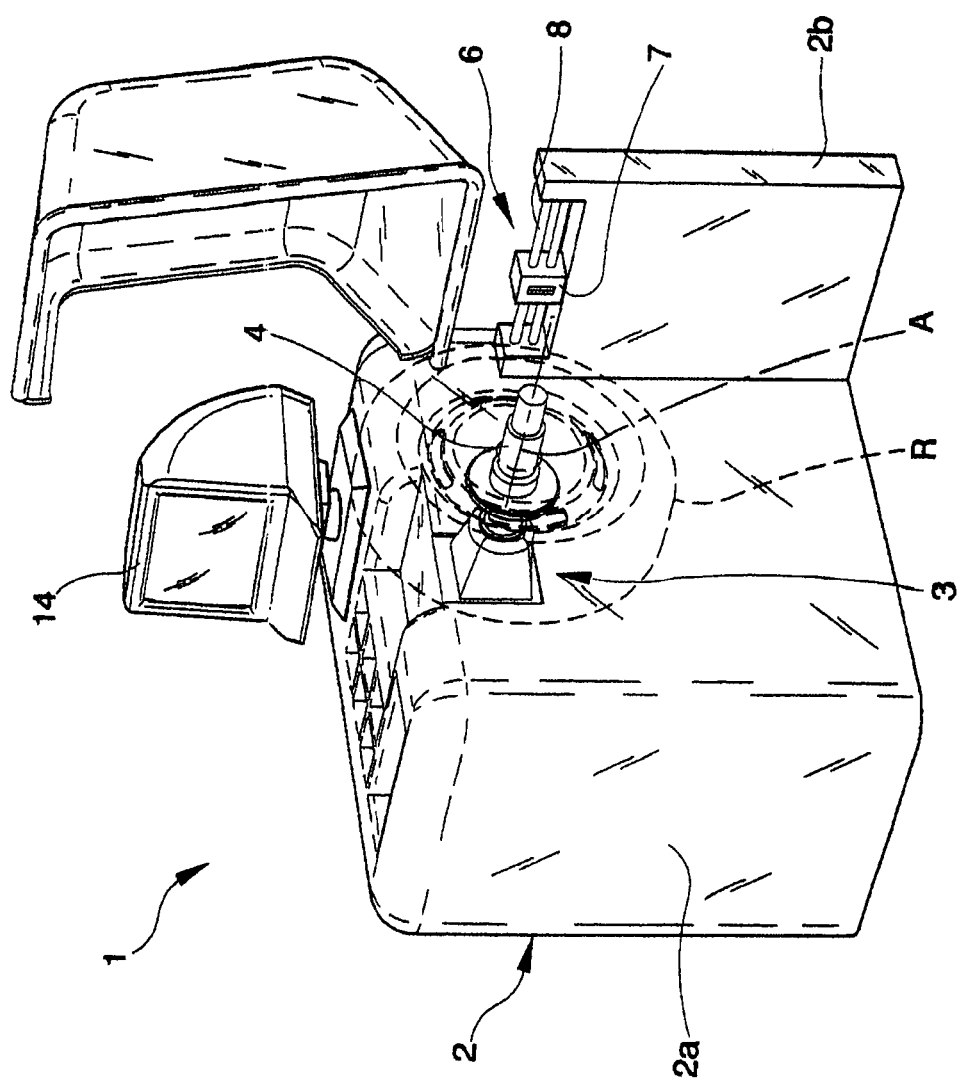
FIG. 1 is a perspective view of the machine according to the invention.

With reference to such figures, an upgraded balancing machine for vehicle wheels has been designated generally by reference number 1.

The machine 1 comprises a frame 2 that supports gripping and rotation means 3 for gripping and rotating a wheel R to be balanced around a substantially horizontal rotation axis A.

Particularly, the frame 2 is made up of a base block 2a, containing the support and motorization system of the gripping and rotation means 3, and of a vertical wall 2b associated with a side of the base block 2a.

The gripping and rotation means 3 comprise a shaft 4 defining the rotation axis A which extends horizontally and overhanging from the base block 2a. The free end of the shaft 4 has a bush suitable for fixing and centering the rim of the wheel R.

The machine 1 comprises first detection means 5 of the unbalance of the wheel R with respect to the rotation axis A.

In particular, the first detection means 5 can comprise a pair of force transducers, of the load cell type or the like, associated together spaced along a section of the shaft 4 and suitable for detecting variations in the forces exercised by the wheel R along the shaft 4 during rotation.

The machine 1 also comprises second detection means 6 for scanning at least a portion of the profile of the wheel R.

The second detection means 6, in the particular embodiment of the invention illustrated in FIG. 1, comprise a first sensor 7, of the non-contact type, such as an optical sensor or a distance laser sensor, which can slide along on straight guiding means 8.

The straight guiding means 8 extend in a direction parallel to that of the rotation axis A and are made up, for example, of two supporting bars fastened to the upper portion of the vertical wall 2b. The sliding of the first sensor 7 along the supporting bars is obtained by means of movement means made up, usefully, of a flexible body, of the belt type or the like, which is closed on itself like a ring, is associated with the first sensor 7 and is wrapped on two rotating disks, one of which is the drive disk and the other the drive disk (note shown).

Advantageously, the second detection means 6 scans a portion of the side surface of the wheel R.

In particular, the machine 1 can envisage a pair of second sensors such as feelers, optical sensors or distance laser sensors, associated moving with, or fixed to the frame 2, and arranged facing the two opposite side surfaces of the wheel R.

The potential cannot, however, be ruled out of first and second different detection means 5 and 6, with different number and arrangement of the force transducers, of the first sensor 7 and of the second sensors.

Advantageously, the force transducers of the first detection means 5 generate, during the rotation of the wheel R, a first analog output signal $S_{A1}$, modulated according to the changes in force detected along the shaft 4.

In the same way, the first sensor 7 (and possibly the second sensors) of the second detection means 6 generates, during the rotation of the wheel R, a second analog output signal $S_{A2}$, modulated according to the particular shape and position of the surface along the circumference of the tire, at the tread.

Figure 2:
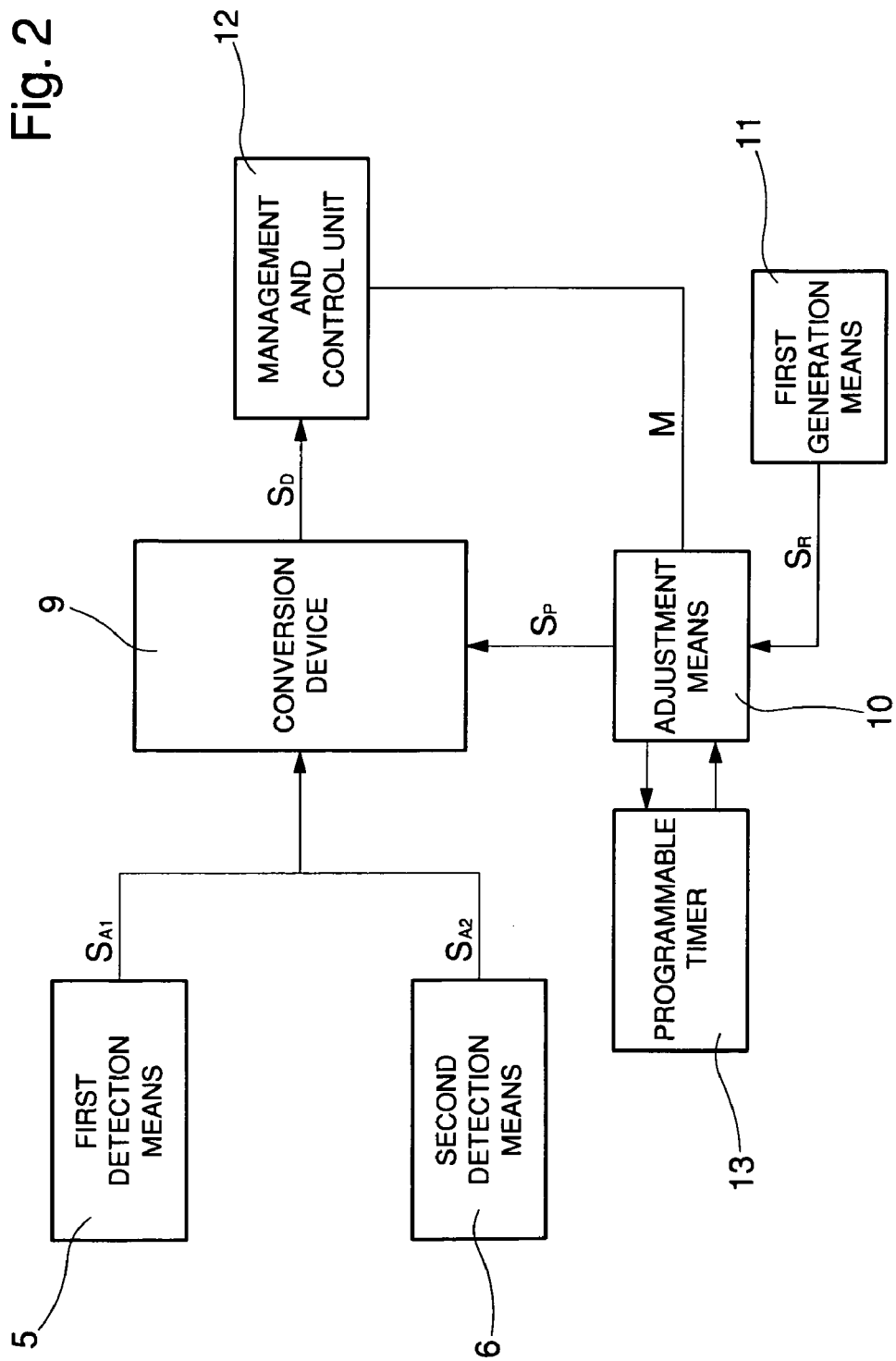
FIG. 2 is an operating diagram of the machine according to the invention.

As the diagram of FIG. 2 shows, the first and second detection means 5 and 6 are operatively associated with a conversion device 9, of the analog-digital converter type, which receives the first and/or the second analog signal $S_{A1}$ and $S_{A2}$ and converts these analog signals into respective digital signals $S_D$.

Advantageously, the machine 1 comprises adjustment means 10 associated with the conversion device 9 and suitable for piloting the sampling frequency of the first and second analog signal $S_{A1}$ and $S_{A2}$.

In particular, the adjustment means 10 are made up of a determination device for determining the above sampling frequency starting with the frequency generated by a programmable timer 13, if necessary synchronized with a reference signal $S_R$.

Usefully, the reference signal $S_R$ can be an electrical signal or pulse produced by first generation means 11, during the rotation of the wheel R and triggered at just one predetermined angular position.

The first generation means 11 are made up of a first detection device of the non-contact type, for example, an optical sensor suitable for scanning or viewing a determined area of reference on the surface of the tire or of the rim of the wheel R.

Alternatively, the first generation device 11 is an encoder which is associated with the shaft 4 and which measures the rotation around its own axis for determining just one, or more, angular positions of the wheel R and for the generation of corresponding reference signals $S_R$.

The reference signal $S_R$ so determined is then sent to the determination device in adjustment means 10 which, by means of the programmable timer 13, generates a piloting signal $S_P$ for the conversion device 9. The sampling frequency of the conversion device is a multiple of the frequency of the reference signal $S_R$ or, in any case, the sampling frequency is substantially greater and synchronous with respect to the frequency of the reference signal $S_R$.

Usefully, a management and control unit 12 is associated with the determination device in adjustment means 10 for selecting the multiplication factor M of the input reference signal $S_R$ and, therefore, for changing the frequency of the output piloting signal $S_P$.

Advantageously, in specific measurement phases and in the event of the wheel R rotating at a preset angular speed, the timer 13 can be suitably programmed according to the angular speed of the wheel R. In this case, therefore, there is no need to synchronize the piloting signal $S_P$ with respect to the reference signal $S_R$ and, consequently, the measurement of just one or more angular positions of the wheel R is superfluous.

Conveniently, the management and control unit 12 is suitable for controlling the determination device 10 for the dynamic adjustment of the sampling frequency during a same measuring cycle. In particular, the frequency of the piloting signal $S_P$ is increased in case of a higher speed of change in the first and/or the second analog signal $S_{A1}$ and $S_{A2}$ or, on the contrary, the frequency of the piloting signal $S_P$ is reduced in case of a reduction in the speed of change of the first and/or the second analog signal $S_{A1}$ and $S_{A2}$.

The machine 1 can also comprise second generation means for generating the reference signal $S_R$ in relation to the movement of the first sensor 7 along the straight guiding means 8 and at predefined axial positions of the first sensor 7 itself.

In particular, the second generation means can comprise a second sensor device, of the type of an encoder, suitable for detecting one or more angular positions of at least one between the rotating disks for the movement of the first sensor 7.

The digital signal $S_D$ resulting from the sampling of the first analog signal $S_{A1}$ and/or the second analog signal $S_{A2}$ is sent to the management and control unit 12, which is a microprocessor system, and is processed for testing unbalance, roundness, eccentricity, tread wear, etc., on the wheel R.

The data thus processed can be sent to display means 14, such as a monitor, for analyzing the results on the part of an operator.

It has been found that the described invention achieves the proposed objects, and, in particular, the fact is underlined that the presence of the adjustment means for the sampling frequency upgrades the quality and the precision of the measurement taken.

In fact, the possibility of sampling the input analog signals at frequencies higher than those commonly used permits a greater resolution of the digital signal obtained, ensuring a precise measurement even in the case of irregular surfaces, such as those of the tire tread.

Furthermore, the presence of the programmable timer permits the execution of particular measurements on the tire, such as taper or roundness, quite apart from the measurement of just one or more angular positions of the wheel.

To this must be added the fact that, in case of the synchronization of the sampling frequency with the frequency of the reference signal, a correct association is in any case ensured between the measurement taken and the corresponding angular position of the wheel.

The invention thus conceived is susceptible of numerous modifications and variations, all of which fall within the scope of the inventive concept.

Furthermore all the details may be replaced by other elements which are technically equivalent.

In practice, the contingent shapes and dimensions may be modified while still falling within the scope of protection of the following claims.

What is claimed is:

1. A balancing machine for vehicle wheels comprising:
a supporting frame for gripping and rotation means for gripping and rotating a wheel to be balanced around a rotation axis, the wheel including a profile,
first detection means for detecting an unbalance of said wheel with respect to said rotation axis and generating a first analog signal,
second detection means for detecting at least one portion of the profile of said wheel and generating a second analog signal,
at least one conversion device connected to at least one of said first and said second detection means for converting at least one of said first and said second analog signal into a corresponding digital signal,
a processing and control unit associated with said at least one conversion device and suitable for processing said digital signal, and
adjustment means for adjusting a sampling frequency of at least one of said first and said second analog signals,
said adjustment means comprising at least one determination device for determining said sampling frequency starting with a frequency generated by a programmable timer,
said determination device synchronizes said sampling frequency with respect to a frequency of at least one reference signal, and
a shaft encoder generates said reference signal for the determination device during the rotation of said wheel and at just one angular position of said wheel with respect to said rotation axis.

2. The machine according to claim 1, wherein said determination device adjusts said sampling frequency with respect to a speed of change of at least one of said first and said second analog signals.

3. The machine according to claim 1, wherein said determination device is associated with said processing and control unit.

4. The machine according to claim 1, wherein said first detection means is an optical sensor.

5. The machine according to claim 1, wherein said first detection means is an encoder.

6. The machine according to claim 1, wherein said reference signal is an electrical signal pulse.

7. The machine according to claim 1, wherein said first detection means comprises at least one force transducer operatively associated with said gripping and rotation means.

8. The machine according to claim 1, wherein said second detection means comprises at least one first detection sensor for scanning a portion of a tread profile of said wheel.

9. The machine according to claim 8, wherein said second detection means comprise guiding means permitting movement of said first sensor in a direction substantially parallel to said rotation axis.

10. The machine according to claim 9, wherein said guiding means comprise at least two supporting bars for said first sensor, associated with said frame and arranged parallel to said rotation axis.

11. The machine according to claim 1, wherein
said adjustment means comprise at least one determination device for determining said sampling frequency starting with a frequency generated by a programmable timer, the determination device being suitable for the synchronization of said sampling frequency with respect to a frequency of at least one reference signal;
said second detection means comprise at least one sensor for scanning at least a portion of a tread profile of said wheel, and guiding means for allowing movement of said sensor in a direction substantially parallel to said rotation axis; and
first generation means for providing a reference signal during the movement of said sensor along said guiding means and at predefined axial positions of said sensor.

12. The machine according to claim 1, wherein said second detection means is an encoder.

13. The machine according to claim 1, wherein said second detection means further includes a second detection sensor for detecting a portion of a side surface of said wheel.

14. The machine according to claim 1, wherein said second detection means comprise at least one first detection sensor for detecting at least a portion of a tread profile of said wheel and at least a second detection sensor for detecting a portion of the side surface of said wheel, at least one of said first sensor and said second sensor being an optical sensor.

15. The machine according to claim 1, wherein said second detection means comprise at least one first detection sensor for detecting at least a portion of a tread profile of said wheel and at least a second detection sensor for detecting a portion of the side surface of said wheel, at least one of said first sensor and said second sensors being a distance sensor.

16. The machine according to claim 1, wherein said second detection means comprise at least one first detection sensor for detecting at least a portion of a tread profile of said wheel and at least a second detection sensor for detecting a portion of the side surface of said wheel, at least one of said first sensor and said second sensor being a laser sensor.

17. The machine according to claim 1, wherein said processing and control unit is a microprocessor unit.

* * * * *